(12) United States Patent
Richter et al.

(10) Patent No.: US 7,232,325 B2
(45) Date of Patent: Jun. 19, 2007

(54) HINGED SIM-TYPE CARD HOLDER

(75) Inventors: Michael Richter, Schalksmühle (DE);
Jürgen Bohn, Lüdenscheid (DE)

(73) Assignee: Lumberg Connect GmbH & Co., KG, Schalksmuhle (DE)

( * ) Notice: Subject to any disclaimer, the term of this patent is extended or adjusted under 35 U.S.C. 154(b) by 0 days.

(21) Appl. No.: 11/264,762

(22) Filed: Nov. 1, 2005

(65) Prior Publication Data
US 2006/0099855 A1    May 11, 2006

(30) Foreign Application Priority Data
Nov. 9, 2004 (DE) .................... 10 2004 054 270

(51) Int. Cl.
*H01R 13/62* (2006.01)
(52) U.S. Cl. ..................... 439/326; 439/331
(58) Field of Classification Search .......... 439/73, 439/326 I, 331
See application file for complete search history.

(56) References Cited

U.S. PATENT DOCUMENTS

| | | | |
|---|---|---|---|
| 4,450,955 A * | 5/1984 | Featherston | 206/39.6 |
| 5,226,826 A | 7/1993 | Nillson | |
| 5,984,707 A * | 11/1999 | Kuwata | 439/326 |
| 5,996,891 A | 12/1999 | Braun | |
| 6,176,721 B1 * | 1/2001 | Gottardo et al. | 439/260 |
| 6,273,739 B1 * | 8/2001 | Konno et al. | 439/331 |
| 6,863,537 B2 * | 3/2005 | Pellizari | 439/31 |
| 6,908,327 B2 * | 6/2005 | Ma | 439/331 |
| 6,913,479 B1 * | 7/2005 | Su et al. | 439/326 |
| 6,971,902 B2 * | 12/2005 | Taylor et al. | 439/342 |
| 6,976,864 B1 * | 12/2005 | Huang | 439/326 |

* cited by examiner

*Primary Examiner*—Thanh-Tam Le
(74) *Attorney, Agent, or Firm*—Andrew Wilford

(57) ABSTRACT

A card holder has a dielectric base adapted to support the card and having an upstanding flange formed with two holes having outer edges spaced apart along an axis by a predetermined distance. A cover is formed with two tabs engageable through the holes and having outer edges spaced apart by slightly less than the predetermined distance. The cover outer edges are formed with respective oppositely outwardly projecting bumps. The tab has at the bumps a width slightly greater than the predetermined width. The cover is deformable such that the tabs can be forced with elastic deformation of the cover through the holes until the bumps pass through the holes. The cover is pivotal about the axis on the base when the tabs are fitted through the hole. A seat on the cover loosely holds the card on the cover limitedly pivotal relative to the cover.

8 Claims, 5 Drawing Sheets

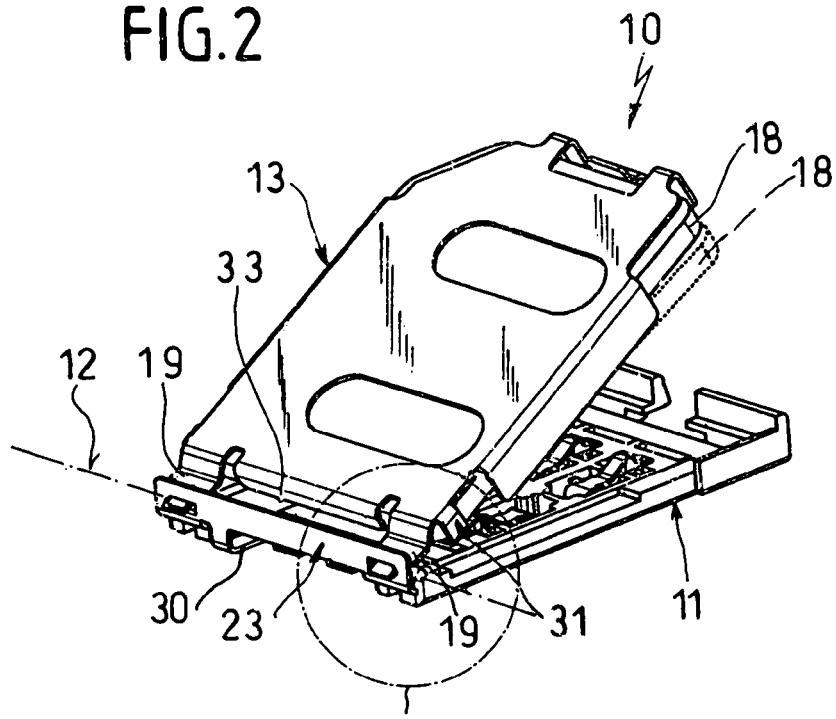
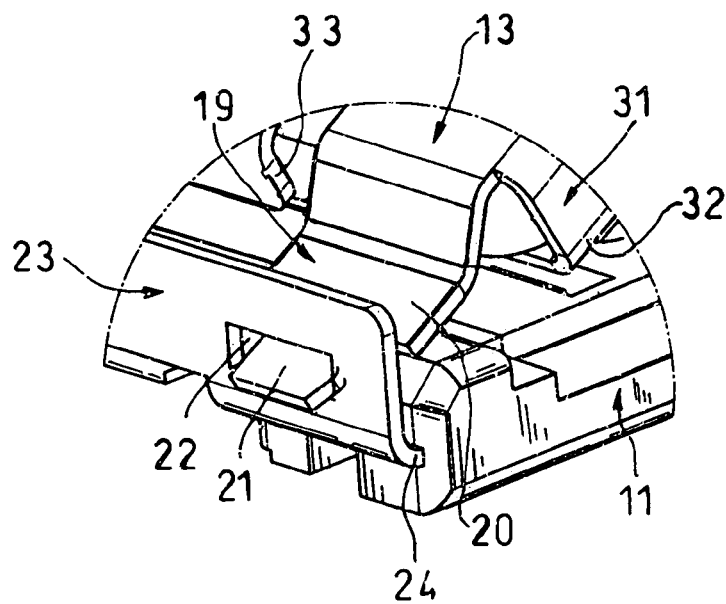

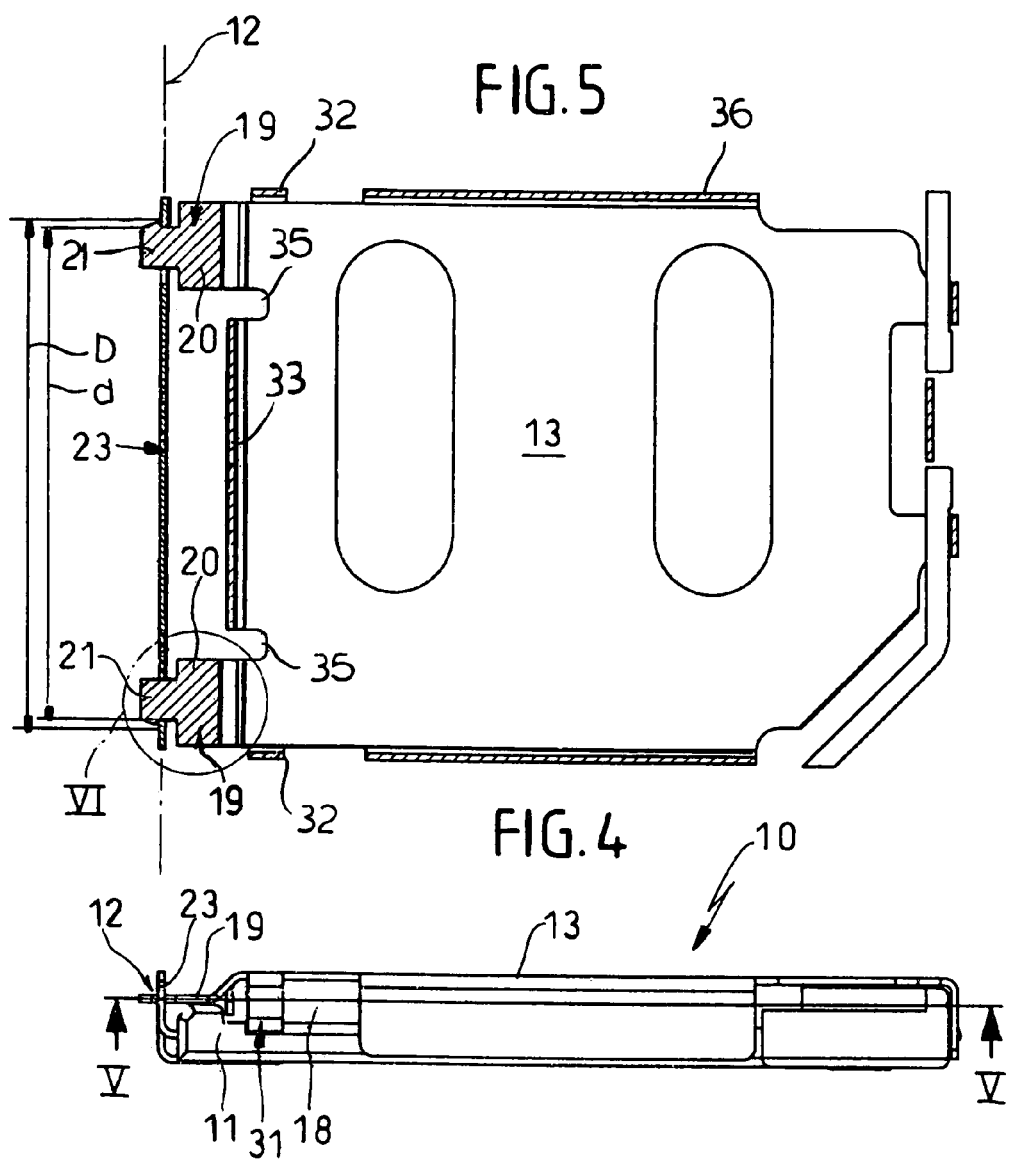

HINGED SIM-TYPE CARD HOLDER

FIELD OF THE INVENTION

The present invention relates to a holder for a SIM-type card. More particularly this invention concerns such a holder with a hinged cover.

BACKGROUND OF THE INVENTION

A smart card, also known as an IC-card or a chip card, is a flat normally plastic card that may be as large as a credit card or, in particularly when used as an SIM (subscriber identity module), as small as a postage stamp. Such a card carries active and passive circuit elements. When used, for instance, as a SIM card it has a small processor and enough memory to hold data regarding the identity and preferences of a user. Such a SIM card is commonly used in a cellular telephone to allow a user to transfer his or her phone book and other data from one phone to another.

The card reader must fulfill several functions in addition to the obvious one of forming connections between contact points on the card and traces of the printed-circuit board normally carrying the holder. First of all it must hold and protect the card physically, something that is particularly important as, for instance, in a cell phone the card holder is in the bottom of the battery compartment where it is exposed as batteries are changed. In addition the card holder must shield the card, in particular from inductive and RF (radio-frequency) fields, another problem particularly present in a cell phone where the card is located a few centimeters from a transmitter.

In commonly owned U.S. Pat. No. 6,863,537 such a holder is described that has a dielectric base fixed to a grounded support and formed with a throughgoing cutout and a conductive cover forming a slot dimensioned to hold a smart card and pivotal on the base between an open position partially raised from the base and a closed position closely juxtaposed with the base and covering the cutout. Ground contacts carried on and electrically connected to the cover are positioned to engage through the cutout directly with the base in the closed position of the cover. Similar holders are described in U.S. Pat. Nos. 5,226,826 and 5,996,891.

Thus with this system closing the cover automatically establishes a connection directly with ground when it is closed, not via any intermediaries. The connection is direct, especially when according to the invention the ground contacts are of the same material as the cover, in fact unitary with the cover. Normally the ground contacts are formed as spring fingers. Thus these ground contacts can be provided without appreciably increasing the production costs of the card holder.

Nowadays the standard SIM card, which normally measures 15 mm by 25 mm is being replaced by a smaller so-called USIM card measuring a mere 12 mm by 15 mm, as the standard application for such a card is in a cellular telephone and these devices are getting ever smaller. Such a card is somewhat more difficult to handle. Getting it into and out of the slot in the holder cover is difficult. In addition the holder for such a small card must be dimensioned also as small as possible.

OBJECTS OF THE INVENTION

It is therefore an object of the present invention to provide an improved holder for a SIM-type IC or chip card.

Another object is the provision of such an improved holder for a SIM-type IC or chip card that overcomes the above-given disadvantages, in particular that is of very compact and simple construction and that makes it particularly easy to install and remove the chip card.

SUMMARY OF THE INVENTION

A card holder has according to the invention a dielectric base forming a support surface adapted to support the card and formed at one end of the support surface with an upstanding flange formed with at least one hole having outer edges spaced apart along an axis by a predetermined distance. A cover is formed with at least one tab engageable through the hole and having outer edges spaced apart by slightly less than the predetermined distance. The cover outer edges are formed with respective oppositely outwardly projecting bumps. The tab has at the bumps a width slightly greater than the predetermined width. The cover is deformable such that the tab can be forced with elastic deformation of the cover through the hole until the bumps pass through the hole. The cover is pivotal about the axis on the base when the tab is fitted through the hole.

This extremely simple structure forms a durable and effective hinge, while at the same time being extremely cheap and simple to manufacture. The holder can be counted on to do its job perfectly, yet costs no more or even less than prior-art such holders.

According to the invention the cover is formed with two such tabs and the flange is formed with two such holes. In addition, to facilitate elastic deformation of the cover during assembly of the holder, the cover is formed inward of each tab with a slot facilitating bending of the slots toward each other.

Each of the bumps has a relatively shallow outer camming flank and a relatively steep inner retaining flank. This makes it possible to force the tabs through the holes to assemble the holder, but makes it much harder to separate the parts, which is acceptable since such separation is not normally every necessary. Furthermore according to the invention the width of the holder at the surfaces of the tabs engaged in the holes is such that the holder bears elastically lightly on the outer edges of the holds. This forms a good electrical connection for grounding of the normally conductive holder to the normally grounded flange of the base. The flange is of conductive material and has a solder tab adapted for connection to ground.

According to another feature of the invention the holder is provided with seat structure closely juxtaposed with the axis on the cover for loosely holding the card on the cover limitedly pivotal relative to the cover about an axis generally coinciding with the base axis. This seat includes side flanges for inhibiting movement of the card on the cover perpendicular and parallel to the axes. It also has a pair of L-shaped tabs extending down and around the card adjacent the axes. With this system the card is inserted in the holder, in the pivoted-up position of the cover, by inserting its end into the seat near the axis, then pivoting it up against the cover, whereupon the cover is pivoted down into the base.

BRIEF DESCRIPTION OF THE DRAWING

The above and other objects, features, and advantages will become more readily apparent from the following description, reference being made to the accompanying drawing in which:

FIGS. 1 and 2 are perspective front and rear views from above of the holder according to the invention when open;

FIG. 3 is a large-scale view of the detail indicated at III in FIG. 2;

FIG. 4 is a side view of the holder when closed;

FIG. 5 is a horizontal section along line V—V of FIG. 4;

SPECIFIC DESCRIPTION

Figure 1:
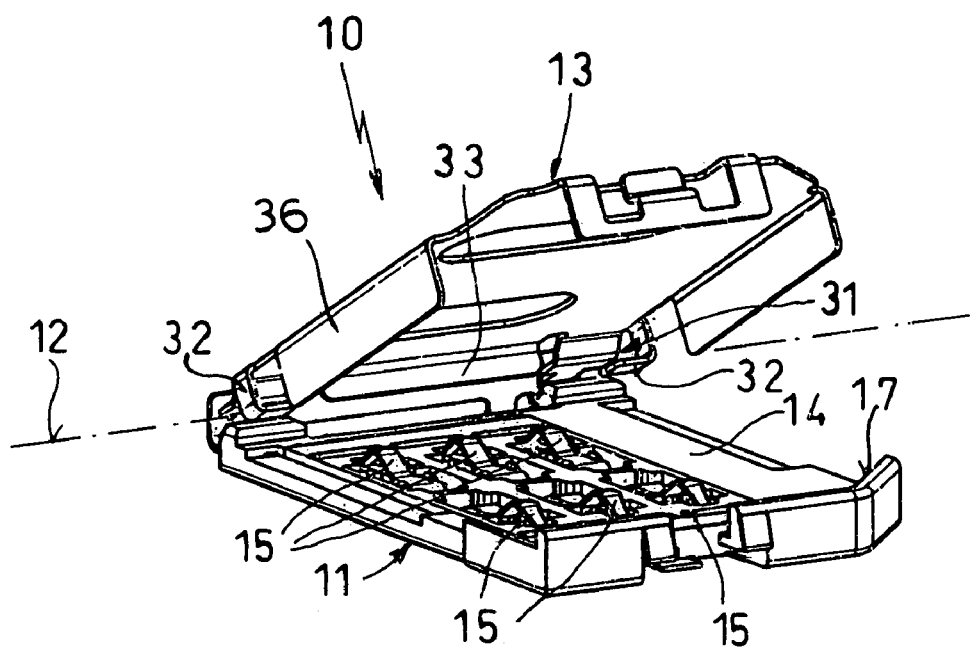
Figure 7:
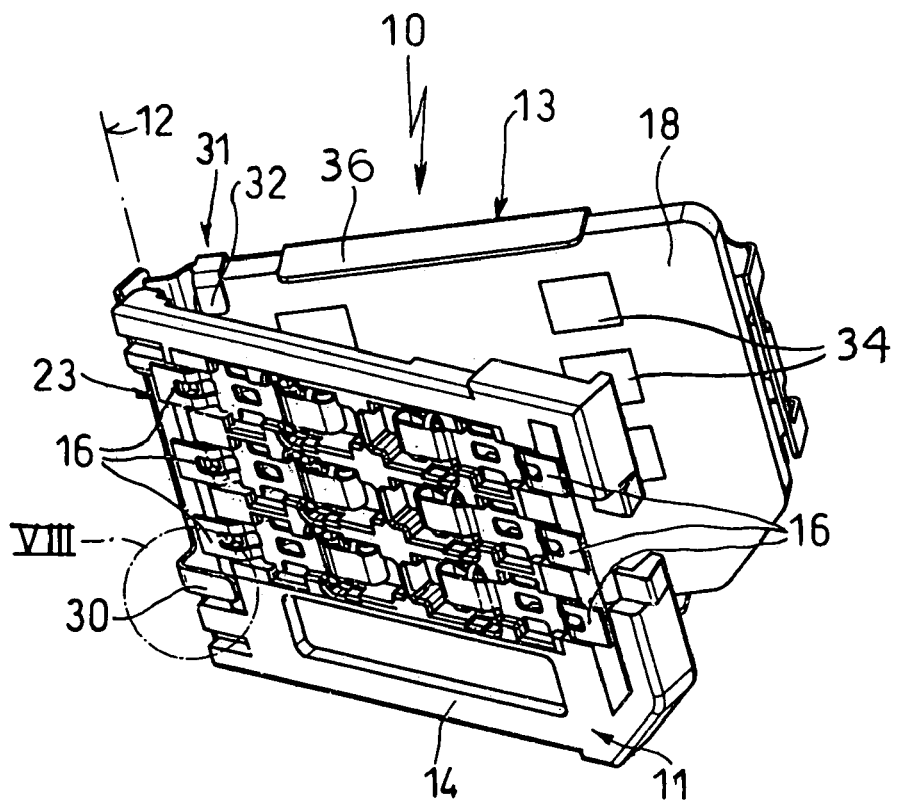
FIG. 7 is a perspective view from below of the holder according to the invention when open.

As seen in FIGS. 1, 2, and 7, a holder 10 according to the invention basically comprises a base 11 normally molded of a dielectric plastic and a cover 13 of some thin conductive material, e.g. stamped and bent sheet metal or metal-plated plastic, that pivots about an end axis 12 on the base 11.

The base 11 has a flat support face 14 from which project spring-like contacts 15 each having on the bottom of the base 11 (see FIG. 7) an SMD contact tab 16 that is soldered to an unillustrated underlying printed circuit when the holder 10 is installed. A USIM chip card 18 fits in a seat 31 described in more detail below of the cover 13 and has contacts 34 that engage the contacts 15 in the closed position of FIG. 4. An alignment formation 17 fits with the standard chamfered corner of the chip card 18 to ensure that it is properly oriented in the holder 10.

Figure 6A:
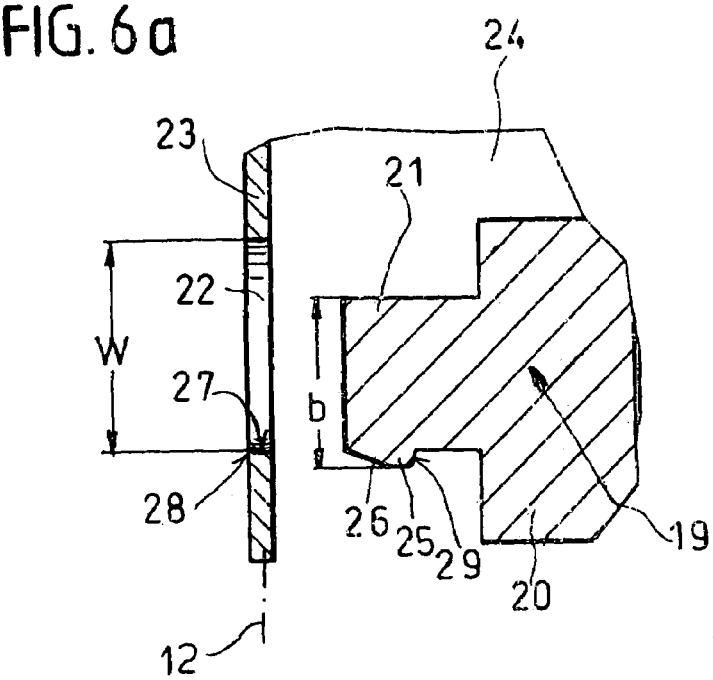
FIGS. 6a and 6b are views corresponding to the detail indicated at VI in FIG. 5 in the disassembled and assembled condition of the holder hinge, respectively.
Figure 6B:
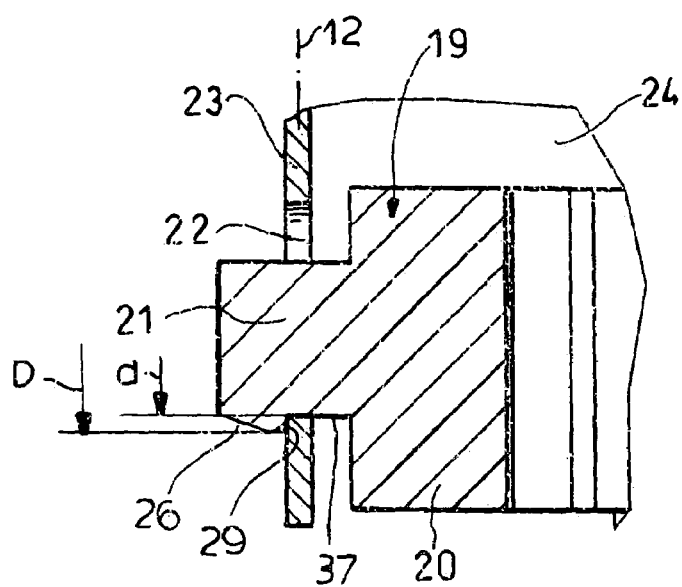
Figure 8:
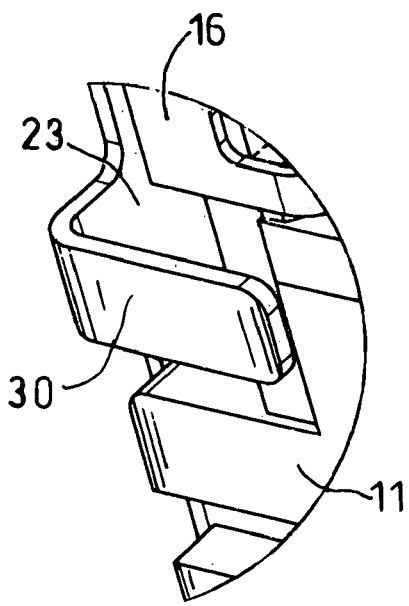
FIG. 8 is a large-scale view of the detail indicated at VIII in FIG. 7.

According to the invention the cover 13 is unitarily formed at its inner end with a pair of symmetrically identical hinge tabs 19 (see also FIGS. 6a and 6b) that each have a wide base 20 and a narrower outer end 21, the latter being adapted to fit through a respective rectangular hole 22 formed in a flange 23 of a L-section conductive part 24 seated in the base 11. This part 24 is provided (see FIG. 8) underneath the base 11 with a solder tab 30, and the part 24 is also conductive so that it forms a conductive path from the cover to a ground connected to the tab 30.

The outer end portions 21 of the tabs 19 are formed as hooks and have oppositely directed bumps 25 each formed with an outer shallow flank 26 and an inner steep flank 29. The holes 22 have widths W that are substantially greater than widths b of the outer portions 21, the latter measured where they are widest, so that the outer portions 21 can in fact fit with some play through the holes 22.

A spacing d between outer edges 27 of the holes 22 is, however, slightly less than a spacing D between outermost extents of the bumps 25. Thus, assuming the cover 13 is completely separated from the base 11, the two can be joined by pushing the tabs 19 through the holes 22. This actions brings the shallow flanks 26 into engagement with outer edges 27 of the holes 22 and elastically deforms the two tabs 19 toward each other, an action that is aided by short slots 35 cut in the cover 13 immediately inward of each tab 19. Once the bumps 25 have been pushed all the way through the holes 22, the cover 13 returns to its normal shape with outer edges 37 of the outer portions 21 bearing lightly on the outer edges 27 of the holes 22 and the steep flanks 29 bearing on an outer face 28 of the flange 23. The camming action of the shallow flanks 26 thus makes it relatively easy to fit the tabs 19 through the holes 22, but the sharp flanks 29 make it very difficult to pull them back out. Once thus assembled, the cover 13 can easily pivot about the axis 12 relative to the base 11, so that the tab 19 and holes 22 form a hinge. The light elastic contact of the outer edges 37 of the tabs 19 with the outer edges 27 of the holes 22 ensures a good electrical contact between the cover 11 and the grounded holder flange 23.

The seat 31 formed by the cover 13 only wraps around and under the chip card 18 at tabs 31 immediately adjacent the axis 12, these tabs 32 extending over less than about 1 mm. Otherwise the seat 31 is defined by an end flange 33 and side and end flanges 36 that extend only in planes perpendicular to the plane of the cover 13 so as only to limit movement of the chip card 18 parallel to the plane of the cover 13, while still allowing it to pivot limitedly as shown by dotted lines in FIG. 2 roughly about the axis 12. This looseness of the chip card 18 at the outer end of the cover 13 makes it relatively to grasp this small item and remove it, unlike the prior-art systems where the chip card must be painstakingly slid out perfectly parallel to the cover.

We claim:

1. In combination with a subscriber-identity-module-type card, a card holder comprising:

a dielectric base forming a support surface adapted to support the card and formed at one end of the support surface with an upstanding flange formed with at least one hole having outer edges spaced apart along an axis by a predetermined distance; and a cover formed with a tab formation engageable through the hole and having outer edges spaced apart by slightly less than the predetermined distance, the tab outer edges being formed with respective oppositely outwardly projecting bumps, the tab formation having at the bumps a width slightly greater than the predetermined distance, the cover being deformable such that the tab formation can be forced with elastic deformation of the cover through the hole until the bumps pass through the hole, the cover being pivotal about the axis on the base when the tab formation is fitted through the hole.

2. The card holder defined in claim 1 wherein the tab formation is comprised of two tabs and the flange is formed with two such holes in each of which a respective one of the tabs is receivable.

3. The card holder defined in claim 2 wherein the cover is formed inward of each tab with a slot facilitating bending of the tabs toward each other.

4. The card holder defined in claim 1 wherein each of the bumps has a relatively shallow outer camming flank and a relatively steep inner retaining flank.

5. The card holder defined in claim 1 wherein the tab formation is unitarily formed of conductive material with the cover, the flange being of conductive material and having a solder tab adapted for connection to ground.

6. In combination with a subscriber-identity-module-type card having a predetermined width, a card holder comprising:

a dielectric base forming a support surface adapted to support the card;

a cover;

hinge means between the cover and the base for pivoting of the cover on the base about a base axis between an open position spaced from the base and a closed position closely juxtaposed with the base; and a seat on the cover at the base axis, open radially of the base axis in only one direction, and having sides spaced apart substantially by the predetermined width, the seat being dimensioned to loosely hold the card on the cover limitedly pivotal relative to the cover about a cover axis generally coinciding with the base axis only when the cover is in the open position.

7. The card holder defined in claim 6 wherein the seat has side flanges inhibiting movement of the card on the cover perpendicular and parallel to the base and cover axes.

8. The card holder defined in claim 6 wherein the seat has a pair of L-shaped tabs extending down and around the card adjacent the base and cover axes.

* * * * *